June 4, 1929.  F. E. COMSTOCK  1,716,031
CLEANING DEVICE
Filed June 24, 1927
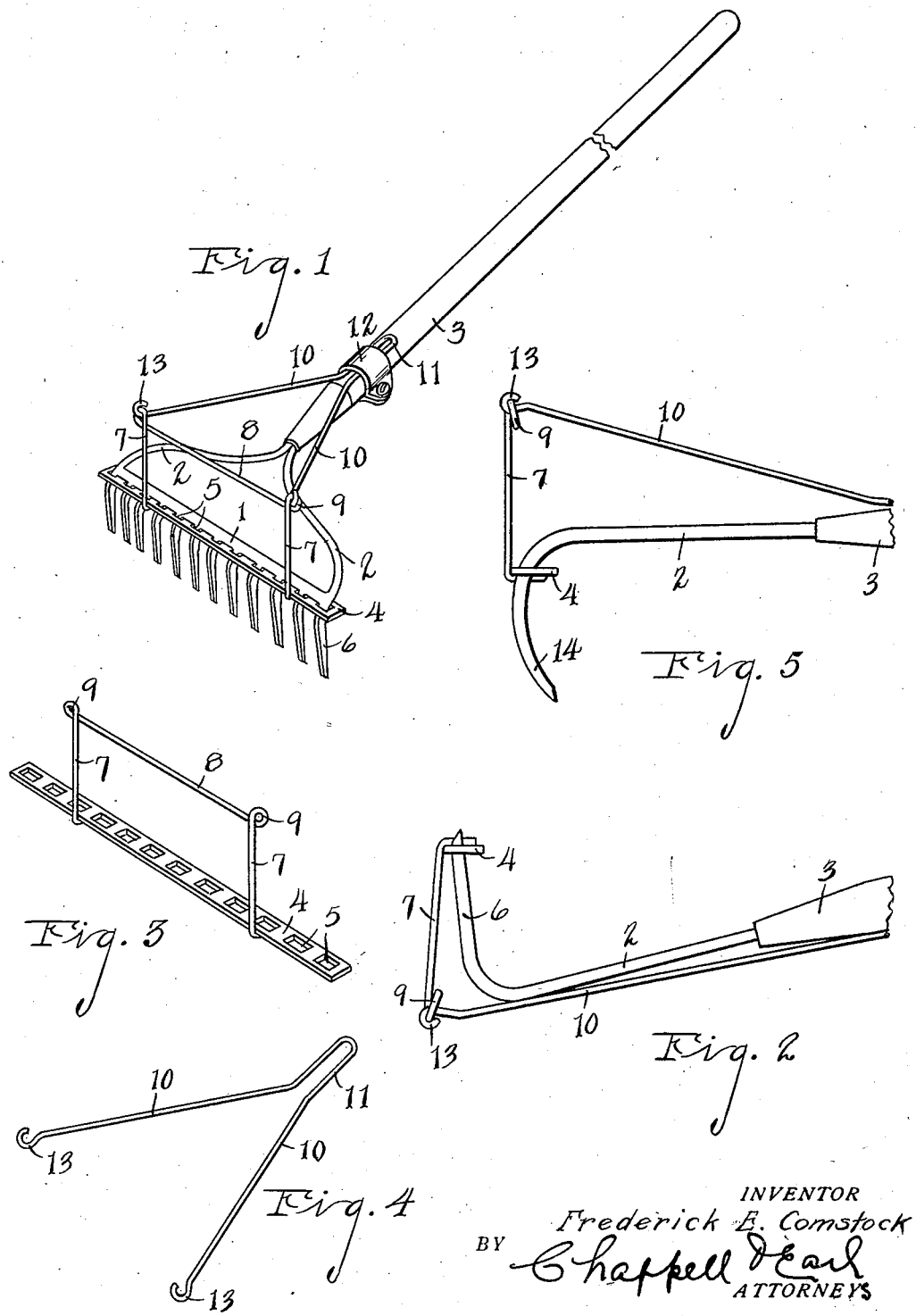
INVENTOR
Frederick E. Comstock
BY Chappell & Earl
ATTORNEYS Patented June 4, 1929.

1,716,031

UNITED STATES PATENT OFFICE.

FREDERICK E. COMSTOCK, OF PAW PAW, MICHIGAN.

CLEANING DEVICE.

Application filed June 24, 1927. Serial No. 201,120.

The main object of this invention is to provide an improved scraper or cleaning device for rakes whereby the teeth may be quickly and effectively cleaned.

A further object is to provide a structure having these advantages which is very simple and economical.

Objects pertaining to details and economies of my invention will definitely appear from the detailed description to follow. The invention is defined and pointed out in the claims.

A structure embodying the features of my invention is clearly illustrated in the accompanying drawing forming a part of this application, in which:

Fig. 1 is a perspective view of a rake embodying the features of my invention, the handle being partially broken away.

Fig. 2 is a detail view showing the manner of operating the scraper.

Fig. 3 is a perspective view of the scraper and its supporting arms removed from the rake.

Fig. 4 is a perspective view of the scraper retracting springs.

Fig. 5 is a fragmentary perspective view of a modified form or embodiment of my invention.

Referring to the drawing, the rake head designated generally by the numeral 1 is provided with a plurality of spaced teeth preferably formed integral therewith as illustrated and with shanks 2 connected to the handle 3. These parts are well-known construction.

The scraper bar 4 is provided with a plurality of holes 5 spaced to receive the teeth 6 of the rake and has upwardly projecting arms 7 connected by the cross bar 8. These arms and cross bars are in the embodiment illustrated formed integrally of a heavy piece of wire or light rod, the coils being formed at the angles to provide eyes 9. Springs 10 are connected at their rear ends by the loop 11, the sides of the loop being arranged parallel, thus forming a securing shank which is superimposed upon the handle of the rake.

The clip or clamp 12 rigidly secures this shank 11 to the rake so that the spring members 10 are supported in a forwardly projecting position and with the eyes 13 at their forward ends engaging the eyes 9 of the arms 7. This serves to normally hold the scraper in its elevated or retracted position as shown in Fig. 1. However, the rake may be inverted and downward pressure on the arms moves the scraper to the position shown in Fig. 2, effectively cleaning the teeth.

The scraper is also well adapted to rakes having curved teeth as 14 shown in Fig. 5.

My improvements are well adapted for embodiment in rakes of the well-known type, adds little to the weight thereof and is simple, economical and at the same durable and convenient to use.

Having thus described my invention, what I claim as new and desire to secure by Letters Patent, is:

1. The combination with a rake head provided with a handle, of a stripper bar having a plurality of openings therein adapted to receive the teeth of the rake and reciprocate thereon, a pair of upwardly projecting arms connected by a cross piece at their upper ends, said arms and cross piece being formed integrally of wire conformed to provide eyes at the upper ends of the arms, a pair of diverging spring members engaging said eyes, said spring members being formed of a piece of wire folded upon itself, its bight end having parallel disposed portions providing a shank superimposed on the handle, and a clamp embracing the handle and said shank whereby the spring member is clamped thereto.

2. The combination with a rake head provided with a handle, of a flat stripper bar having a plurality of openings therein adapted to receive the teeth of the rake, a pair of upwardly projecting arms connected by a cross piece at their upper ends, said arms and cross piece being formed integrally of wire conformed to provide eyes at the upper ends of the arms, and a pair of diverging spring members mounted on said handle and engaged at their forward ends with said eyes.

In witness whereof I have hereunto set my hand.

FREDERICK E. COMSTOCK.